US006892317B1

(12) United States Patent
Sampath et al.

(10) Patent No.: US 6,892,317 B1
(45) Date of Patent: May 10, 2005

(54) SYSTEMS AND METHODS FOR FAILURE PREDICTION, DIAGNOSIS AND REMEDIATION USING DATA ACQUISITION AND FEEDBACK FOR A DISTRIBUTED ELECTRONIC SYSTEM

(75) Inventors: Meera Sampath, Penfield, NY (US); Charles P. Coleman, Rochester, NY (US); Tracy E. Thieret, Webster, NY (US); Ronald M. Rockwell, Rochester, NY (US); Charles B. Duke, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/464,597

(22) Filed: Dec. 16, 1999

(51) Int. Cl.[7] .............................................. G06F 11/00
(52) U.S. Cl. ........................................... 714/4; 714/46
(58) Field of Search ...................... 714/4–5, 44, 46–57, 714/25, 26

(56) References Cited

U.S. PATENT DOCUMENTS

| | | |
|---|---|---|
| 4,071,911 A | 1/1978 | Mazur |
| 4,086,434 A | 4/1978 | Bocchi |
| 4,583,834 A | 4/1986 | Seko et al. |
| 5,038,319 A | 8/1991 | Carter et al. |

(Continued)

FOREIGN PATENT DOCUMENTS

| | | |
|---|---|---|
| EP | 0 599 606 A2 | 6/1994 |
| EP | 0 854 632 | 7/1998 |
| EP | 0 895 399 A1 | 2/1999 |
| JP | 410083134 A  *  3/1998 | .......... G03G/21/00 |

OTHER PUBLICATIONS

IBM Tech. Disc. Bull., "Diagnostic Error Logging in a Copier Monitoring System", May 1985, vol. 27, iss. 12, pp. 7236–7237.*
"Remote Diagnostics Systems," Paul F. Morgan, Xerox Disclosure Journal, vol. 3, No. 3, May/Jun. 1978, pp. 191–192.
"Real Time Fault Monitoring of Industrial Processes," Chapter 4.2.2.—Event-based architecture for real-time fault diagnosis, A.D. Pouliezos et al., Kluwer Academic Publisher, 1994, pp. 284–287.

(Continued)

*Primary Examiner*—Scott Baderman
(74) *Attorney, Agent, or Firm*—Oliff & Berridge, PLC; Eugene O. Palazzo

(57) ABSTRACT

By using monitoring data, feedback data, and pooling of failure data from a plurality of electronic devices, real-time failure prediction and diagnoses of electronic systems operating in a network environment can be achieved. First, the diagnostic system requests data on the state of a machine and/or its components and collections thereof as part of the machine's normal operation. Secondly, real-time processing of the data either at the machine site or elsewhere in the distributed network allows for predicting or diagnosing system failures. Having determined and/or predicted a system failure, a communication to one or more remote observers in the network allows the remote observers to view the diagnostic information and/or required action to repair the failure. Furthermore, interrogation of either the particular electronic system, or a database containing data on similar electronic systems by the diagnostic server allows the diagnostic server to refine original diagnoses based on this population data to achieve a comprehensive failure predication/diagnosing system.

34 Claims, 6 Drawing Sheets

U.S. PATENT DOCUMENTS

| | | | |
|---|---|---|---|
| 5,057,866 A | | 10/1991 | Hill, Jr. et al. |
| 5,084,875 A | | 1/1992 | Weinberger et al. |
| 5,365,310 A | | 11/1994 | Jenkins et al. |
| 5,510,876 A | | 4/1996 | Hayashi et al. |
| 5,510,896 A | | 4/1996 | Wafler |
| 5,515,503 A | * | 5/1996 | Shimomura et al. .......... 714/26 |
| 5,580,177 A | | 12/1996 | Gase et al. |
| 5,612,902 A | | 3/1997 | Stokes |
| 5,619,307 A | | 4/1997 | Machino et al. |
| 5,642,202 A | | 6/1997 | Williams et al. |
| 5,680,541 A | * | 10/1997 | Kurosu et al. ................ 714/26 |
| 5,694,528 A | | 12/1997 | Hube |
| 5,727,135 A | | 3/1998 | Webb et al. |
| 5,748,221 A | | 5/1998 | Castelli et al. |
| 5,761,505 A | | 6/1998 | Golson et al. |
| 5,835,816 A | | 11/1998 | Sawada et al. |
| 5,838,596 A | * | 11/1998 | Shimomura et al. ........... 703/6 |
| 5,844,808 A | | 12/1998 | Konsmo et al. |
| 5,884,118 A | | 3/1999 | Mestha et al. |
| 5,887,216 A | | 3/1999 | Motoyama |
| 5,892,451 A | | 4/1999 | May et al. |
| 5,893,083 A | | 4/1999 | Eshghi et al. |
| 5,923,834 A | * | 7/1999 | Thieret et al. ................ 714/25 |
| 5,999,757 A | * | 12/1999 | Shimomura et al. ........... 399/9 |
| 6,023,525 A | | 2/2000 | Cass |
| 6,023,595 A | | 2/2000 | Suzuki et al. |
| 6,343,236 B1 | * | 1/2002 | Gibson et al. ................ 700/79 |
| 6,519,552 B1 | * | 2/2003 | Sampath et al. ............ 702/183 |

OTHER PUBLICATIONS

"Fault Diagnosis in Dynamic Systems Using Analytical and Knowledge–based Redundancy—A Survey and Some New Results," Paul M. Frank, Automatica, vol. 26, 90 International Federation of Automatic Control, 1990, pp. 459–474.

"Combining Expert System and Analytical Redundancy Concepts for Fault–Tolerant Flight Control," David A. Handelman et al., Princeton University, J. Guidance, vol. 12, No. 1, Jan.–Feb. 1989, pp. 39–45.

Naoki Ura et al: "Remote Maintenance Function For Distributed Control System" Advances in Instrumentation and Control, Instrument Society of America, Research Triangle Park, US, vol. 48, No. Part 3, 1557–1564, XP000428426.

* cited by examiner

SYSTEMS AND METHODS FOR FAILURE PREDICTION, DIAGNOSIS AND REMEDIATION USING DATA ACQUISITION AND FEEDBACK FOR A DISTRIBUTED ELECTRONIC SYSTEM

BACKGROUND OF THE INVENTION

1. Field of Invention

This invention relates to the failure prediction, diagnosis and remediation of an electronic system in a distributed network.

2. Description of Related Art

Current diagnostic systems use telephone lines for transmitting data originating from an electronic system to a remote location. This remote location processes the information received from the electronic system for determining a failure diagnosis of the electronic system. For example, in U.S. Pat. Nos. 5,923,834, 5,727,258, 5,778,791, 5,757,514, 5,568,618, and 5,459,552, all of which are incorporated herein by reference in their entirety, various techniques of remote interactive communication are discussed. For example, some existing systems use networks for failure prediction where their diagnosis is based on querying data in the form of a network device management information base (MIB). Other systems perform remote diagnosis by collecting information from the managed device via a network in response to specific commands.

SUMMARY OF THE INVENTION

While existing systems and methods allow failure diagnosis at remote locations, the systems fail to utilize the versatility afforded by a network environment having a plurality of interconnected electronic systems. Accordingly, the systems and methods of this invention interconnect a plurality of electronic systems. These electronic systems are connected to a diagnostic server which receives data from the one or more electronic systems. This data can be as rudimentary as machine operational status to highly complex data that could, for example, indicate a particular component failure or be used for future failure prediction analyses, or for scheduling of routine maintenance. Also, the data could be as basic as a single component's on-off data, to system level measurement data, such data being collected in several different operational modes of the device, such as normal, failed, diagnostic, limp-along, or the like. This data allows for the determination of system faults and provides for the initialization of corrective or repair action.

The diagnostic server, controlling and analyzing the data received from the one or more electronic systems, determines an appropriate action to take in response to this data. This determination can be based on a direct correlation of the received data from the one or more electronic systems to an appropriate remedial action, or alternatively, derived from a database that stores information for similar systems in the network. Thus, with the combination of resources available from the one or more electronic systems and the wealth of information available to the diagnostic server, through the monitoring of data transferred and stored from all the electronic systems in the network, as well as from secondary sources, a highly reliable action or response can be generated in response to the information received from and/or stored about the one or more electronic systems.

Having determined an appropriate action to take based on at least one of the data received from the one or more electronic systems and/or population data received and stored from the other electronic systems, the diagnostic server determines an appropriate routing of the action request. This action request is forwarded to an appropriate vendor, a service provider, a vendor, a parts/consumables supplier, and/or to an autonomous repair agent. For example, assume the systems and methods of this invention are operating in a networked environment where networked printers are the electronic systems. The diagnostic server, having knowledge that the printers require a certain component to be changed once a page count reaches a threshold, monitors the electronic systems, e.g., the printers, to receive diagnostic data corresponding to this threshold. Once the threshold is reached, the diagnostic server generates a request which could then be automatically forwarded to, for example, a parts/consumables supplier. The parts/consumables supplier, having received the request, could automatically forward the necessary replacement part(s) to the location where the networked printer is located.

Alternatively, the diagnostic server can send the appropriate information to the electronic system to initiate an "automatic repair sequence." This automatic repair sequence could be an electronic system based routine, or a combination of electronic system based routines and diagnostic server routines that allow for automatic repair, e.g., calibration, of the electronic system.

Additionally, it is to be appreciated that while the systems and methods of this invention may exist in environments where one or more network security features are present, such as network firewalls, the systems and methods can be modified to account for these network security features without affecting the operational characteristics of the invention.

The systems and methods of this invention provide diagnostic prediction, diagnosis, and remediation services for one or more interconnected electronic systems.

The invention separately provides systems and methods for acquiring and processing a variety of data including component level data, system level data, job level data and event level data from one or more electronic systems to facilitate failure prediction, diagnosis, and remediation.

This invention separately provides systems and methods for determining an appropriate action based on data received from one or more electronic systems.

This invention separately provides systems and methods that generate an action request in response to status information received from one or more electronic systems.

This invention separately provides systems and methods that allow for the generation and routing of data to facilitate failure prediction, remediation and diagnosis in an electronic system.

This invention separately provides systems and methods that allow automatic scheduling of service, parts and/or consumables to be provided to an electronic system.

This invention separately provides systems and methods that allow automated remediation of faults, either completely or partially, with or without human intervention.

The invention separately provides systems and methods that allow electronic systems to be interrogated and controlled remotely over a network for the acquisition of data for use in failure prediction, diagnosis and/or remediation.

This invention additionally provides systems and methods for using the pooled information received from a plurality of electronic systems to develop and derive additional prediction, diagnosis and remediation methodologies and content for the electronic systems.

This invention separately provides systems and methods for the presentation of the results of the failure prediction, diagnosis and/or remediation, locally or, remotely, such as, for example, on a computer user interface, via e-mail, a paging service, a cellular phone, a web page, or the like.

The diagnostic systems and methods of this invention use a combination of single device monitoring data, population data, and feedback information to determine an appropriate action in response to status information received from the one or more electronic systems. Specifically, based on one or more of an appropriate action determined by a diagnostic server, and the transmission of specific data types directly or indirectly to one or more of a service provider and/or parts/consumables supplier, the appropriate assistance, repair, parts and/or supplies are provided to the electronic system(s) which is predicted to fail, or has failed.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

The systems and methods of this invention, by acquiring, processing, and routing a variety of data types between a plurality of service/part suppliers and/or one or more diagnostic servers and secondary information resources is able to effectively predict, diagnose, repair, schedule and/or ship service and/or parts to the one or more electronic devices connected to the network. Furthermore, since the electronic devices, diagnostic server and parts and service providers are all interconnected, the system is capable of pooling diagnostic data received from the plurality of electronic systems to provide a richer database from which failure prediction analysis can be generated. By combining the rich resources available to a diagnostic server, a reduction in service time and parts acquisition time is achieved. This reduced service time at least translates directly to maximizing the up-time of electronic systems by accurately predicting degradations and managing the resulting repair process to minimize the customer downtime impact.

Figure 1:
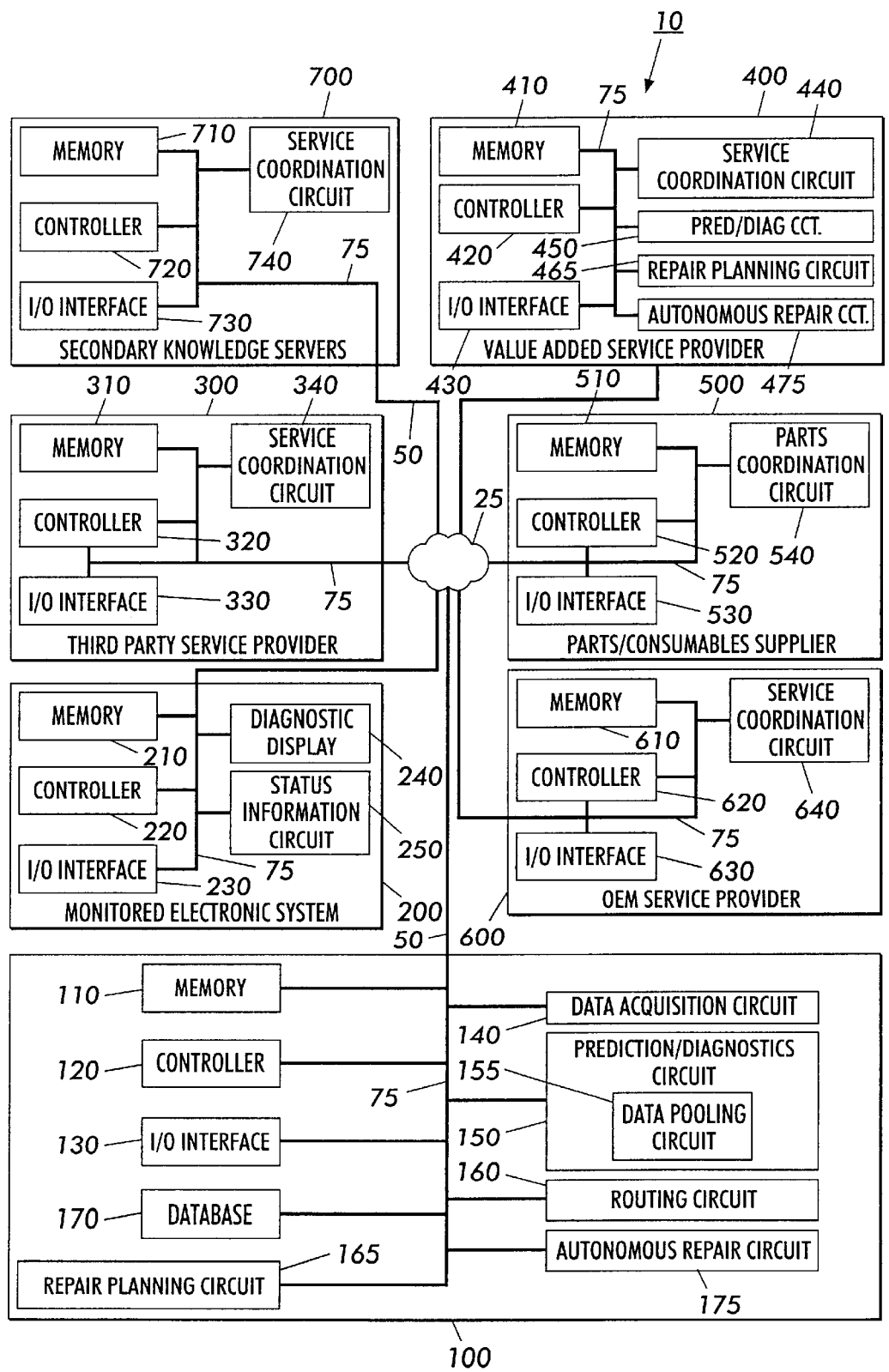
FIG. 1 is a functional block diagram showing a first embodiment of the diagnostics system according to this invention.

FIG. 1 illustrates the diagnostic system in accordance with this invention. The diagnostic system 10 comprises a diagnostic server 100, one or more monitored electronic systems 200, one or more third party service providers 300, one or more value added service providers 400, one or more parts/consumables suppliers 500, and one or more original equipment manufacture (OEM) service providers 600 and one or more secondary knowledge servers 700. The various components of the diagnostic system 10 are interconnected, with links 50, to one or more networks 25, additional diagnostics servers and/or other electronic systems.

The network 25 can be any one of, or combination of, a direct serial connection, a distributed network such as an intranet, a local area network, a metropolitan area network, a wide area network, a satellite communication network, an infrared communication network, the Internet, or the like.

Furthermore, the links 50 can be a wired or wireless link or any other known or later developed element(s) that is capable of supplying electronic data to and from the connected elements.

The diagnostic server 100 comprises a memory 110, a controller 120, an I/O interface 130, a data acquisition circuit 140, a prediction/diagnostic circuit 150, a repair planning circuit 165, an autonomous repair circuit 175, a data pooling circuit 155, a routing circuit 160 and a database 170, all interconnected by link 75.

The one or more monitored electronic systems 200 comprise a memory 210, a controller 220, an I/O interface 230, and optionally, one or more of a diagnostic display 240, a status information circuit 250, a prediction/diagnostic circuit (not shown) and an automated repair circuit (not shown), all interconnected by link 75.

The one or more third party service providers 300 comprise a memory 310, a controller 320, an I/O interface 330 and a service coordination circuit 340, all interconnected by link 75.

The one or more value added service providers 400 comprise a memory 410, a controller 420, a prediction/diagnostic circuit 450, a repair planning circuit 465, an autonomous repair circuit 475, an I/O interface 430 and a service coordination circuit 440, all interconnected by link 75.

The one or more parts/consumables suppliers 500 comprise a memory 510, a controller 520, an I/O interface 530 and a parts coordination circuit 540, all interconnected by link 75.

The one or more OEM service providers 600 comprise a memory 610, a controller 620, an I/O interface 630 and a service coordination circuit 640, all interconnected by link 75.

The one or more secondary knowledge servers 700 comprise a memory 710, a controller 720, an I/O interface 730 and a service coordination circuit 740, all interconnected by link 75.

It should be appreciated the links 75 can be any known or later developed wired or wireless links or a data bus that is capable of supplying electronic data to and from the connected elements.

In operation, the one or more monitored electronic systems 200 generate status information, e.g., control data, process data, and diagnostic data, during the course of operation. Specifically, during the course of operation, and in conjunction with the controller 220 and the memory 210, the status information circuit 250 generates status information pertaining to the operational state of the one or more monitored electronic systems 200. For example, this status information can be as simple as an on/off status of the electronic system to highly specialized data which could, for example, pertain to itemization of one or more components within the system which have actually failed. Moreover, the data could be as simple as a single component on-off data to system level measurement data. Specially, the data can include, but is not limited to control data such as commands issued by system and subsystem controllers, scheduling and timing data, set-point and actuator data, sensor data, state estimate data and the like, diagnostic data such as fault counts, error counts, event counts, warning and interlock counts, calibration data, device set-up data, high frequency service item information, service history data, machine history data and the like, environmental data such as temperature and humidity data, machine usage data machine configuration data value-added diagnostic data such as trend information, component signatures, qualitative state estimates, quantitative state estimates, and the like. Additionally, the data could be generated as part of the normal operation of the device, or in response to specific interrogation and control commands issued by an external agent. For example, in the case of printing systems, the data could also include job level data such as number of pages in the job, the type of media used, the size of the job, the printing options, the finishing options, the number of pages actually printed, the number of images actually processed, and the like. Moreover, the data could be acquired in various operational modes of the device, including, but not limited to, normal, failed, diagnostic, limp-along, or the like. For example, the systems and methods described in U.S. Provisional Application No. 60/145,016, incorporated herein by reference in its entirety, could be used to actually determine local systems faults in a particular electronic system. Additionally, the systems and methods described in copending U.S. patent application Ser. Nos. 09/450,185, 09/450,183, 09/450,182, 09/450,181, 09/450,180, 09/464,596, and 09/450,177, each of which being incorporated herein by reference in its entirety, could also be used in conjunction with the systems and methods of this invention. However, it is to be appreciated that in general any method of assembling information pertaining to the electronic system for forwarding to the appropriate destination will work equally well with the systems and methods of this invention.

Having determined the status information for the particular electronic system, the status information circuit 250, in cooperation with the I/O interface 230, forwards the status information to the diagnostic server 100 via link 50 and the network 25. Additionally, and depending on the particular construction of the monitored electronic system, the status information circuit 250 could forward all, or a portion of, the status information to the diagnostic display 240 or directly to one or more of a service and/or parts supplier, or other entity on the network. For example, this diagnostic display 240 could be used to determine the operational status of the monitored electronic system.

The diagnostic server 100, having received the status information from the monitored electronic system 200 routes the status information, with the cooperation of the I/O interface 130, the controller 120 and the memory 110, to the data acquisition circuit 140, via link 75. The data acquisition circuit 140, in cooperation with the controller 120, forwards a copy of the status information to the database 170 and to the prediction/diagnostics circuit 150. Thus, the database 170 has the capability of storing status information pertaining to the plurality of monitored electronic systems 200.

The prediction/diagnostics circuit 150 receives the status information from the monitored electronic system. Based on the content on the status information, the prediction/diagnostics circuit 150 performs certain operations. First, the prediction/diagnostics circuit 150 makes a determination as to whether the status information indicates that the electronic system has failed, or is predicted to fail, based on a prognostic/diagnostic analysis of the information, or whether additional tests or data are required to make the determination. If additional data is required, this data is acquired and processed to determine if a failure has happened, or is impending. Next, if a failure is detected, or is suspected, the repair planing circuit 165 determines a corrective repair action. For example, in an environment where the monitored electronic systems are printers, this status data could correspond to a printer error or other information that is critical to its non-operational status. In general, this status data is any data that indicates the one or more electronic systems have failed and any additioanl related device status information. During this diagnostic analysis one or more secondary knowledge sources 700 can be accessed to acquire additional information and/or expertise.

The prediction/diagnostics circuit 150 determines if the status information is "prediction" or "diagnostic" information. Prediction information is defined as any status information which is pertinent to determining whether an action should be taken to avoid a particular impending outcome. For example, again in the illustrative embodiment, the monitored electronic systems is a printer. If the status information corresponds to information relating to a particular threshold, this prediction information can be used to help avert a particular failure in the electronic system. Accordingly, the prediction/diagnostic circuit 150 processes the prediction information in accordance with a number of protocols. The prediction and/or diagnostic analysis can be based on a variety of analysis techniques including, but not limited to, threshold analysis, statistical analysis, signature analysis, trend analysis, timing analysis, event sequence analysis, pattern analysis, image processing techniques, quantitative and qualitative state estimation techniques, model based diagnostic technologies, look-up tables, neural network based analysis, fuzzy logic based analysis, a bayesian network, a causal network, a rule based system, expert systems and other reasoning mechanisms. This analysis can be based on information stored in the database. For example, in the case of threshold analysis, the prediction/diagnostic circuit 150 can compare the device status information to status information in database 170, where the database 170 contains information such as threshold values, event counts, error counts, fault counts, or other fixed values which either indicate a failure or trigger a further detailed prognostic analysis. Alternately, processing of the prediction information can comprise, with the cooperation of the data pooling circuit 155, the querying of database 170 for similar status information received from one or more of the other monitored electronic systems 200. This stored status information can be used in combination with the current machine status information to aid in the prognostic analysis. Finally, the prediction/diagnostic circuit 150 can also use a combination of fixed comparisons and data pooling to arrive at a given conclusion. Again, one or more secondary knowledge and/or information sources can be accessed and integrated to improve the relaibility of the prognostic analysis.

Once the analysis of the electronic system is performed, the repair planning circuit 165 determines an appropriate action in response to the received status information. Having determined an appropriate action, the routing circuit 160, in cooperation with the controller 120 and the I/O interface 130, routes the action request to the appropriate service, repair, and/or parts/consumable supplier, or to an autonomous repair agent.

Furthermore, it is to be appreciated that the diagnostic server can enter an "automatic repair mode." In this automatic repair more, instead of routing an action request to a particular service and parts/consumable suppliers, the diagnostic server can forward command and control signals back to the electronic system. Thus, if the electronic system has encountered a fault, such as a need for recalibration, the diagnostic server can initialize an automatic repair sequence by sending the appropriate control signals back to the electronic system.

Table 1 illustrates an exemplary status information and subsequent action request that could be received from the one or more monitored electronic systems 200.

TABLE 1

| STATUS INFORMATION | ACTION | RECIPIENT |
|---|---|---|
| Printer Page Count | Check Threshold - Request Service/ Consumables as Appropriate | Consumables Supplier |
| Toner Low | Request Toner | Parts Supplier |
| Component Failure | Request Replacement Part and Service Call | Parts Supplier Third Party Service Provider |
| General Failure | Service Request | OEM Service Provider |
| Environmental Conditions | Pool Data | N/A |
| Customer Replaceable Unit Failure | Request Part Direct Customer to perform Repair | Parts Supplier Customer |
| Poor Image Quality (In case of Printers) | Perform automated system set-up | Autonomous Repair Agent |
| Redundant Component Failure | Re-configure system to work with normal, redundant component Request replacement part Request service call | Autonomous repair agent Parts Supplier Service Provider |

Having determined an appropriate action request, the diagnostic server 100 forwards the action request to the appropriate service and/or parts/consumables supplier and/or to the device itself via link 50 and the network 25. The appropriate service and/or parts/consumables supplier then either schedules a service and/or ships a part based on the received action request. In the case of autonomous repair, the autonomous repair agent 175 performs the necessary repair action. In addition, the repair action taken may be logged in the database 170.

For example, a third party service provider 300 could be used for providing routine service or maintenance within a given geographic area of the one or more monitored electronic systems. In this illustrative embodiment, the third party service provider 300, would receive, via link 75 and the I/O interface 330, the action request. In cooperation with the controller 320 and the memory 310, the action request would be forwarded to the service coordination circuit 340. The service coordination circuit 340, having received the action request, could, for example, automatically schedule a service date for the electronic system, immediately dispatch a service technician to the electronic system, and/or inform the third party service provider 300 that routine maintenance on the electronic system is needed within a given period, or the like. Alternatively, if the diagnostic server determines the most appropriate routing of the action request is to the value added service provider 400, the action request is routed via link 50 and network 25, to the value added service provider 400. As with the third party service provider 300, the value added service provider 400 receives the action request via link 75 and the I/O interface 430, in cooperation with memory 410 and the controller 420, at the service coordination circuit 440. The service coordination circuit 440 then appropriately schedules a service corresponding to the received action request. Alternately, the value added service provider 400 could perform additional diagnostic/prognostic analysis based on the status information and/or data received. Furthermore, the value-added service provider could further interrogate and control the device and obtain additional data to be used to facilitate failure prediction, diagnosis, and or remediation through the use of one or more of the prediction/diagnostics circuit 450, the repair planning circuit 465 and the autonomous repair circuit 475, as previously discussed.

Alternatively, if the action request is for a part, e.g., a replacement part, or a consumable, e.g., a toner cartridge, the action request is forwarded via link 50 and network 25 to the parts/consumable supplier 500. The parts/consumable supplier 500, having received the action request over link 75 and via the I/O interface 530, forwards the action request to the parts coordination circuit 540 with the cooperation of the controller 520 and the memory 510. The parts coordination circuit 540 comprises the necessary architecture to schedule shipment of the part and/or consumable to the particular electronic system. For example, the parts coordination circuit 540 can associate the action request with a location address of the electronic system, the number of required parts, and the part description itself. Furthermore, the parts coordination circuit 540 could also automatically schedule the shipment of the one or more parts and/or consumables to the electronic system 200. Furthermore, the parts/consumable supplier 500 can communicate with the one or more service providers to appropriately route the parts and/or consumable as needed if a service is also needed in conjunction with the part.

For example, assume a particular component on an electronic system has failed. The diagnostic server 100 routes an action request for service to the value added service provider 400 and an action request for a replacement part to the part/consumable supplier 500. Having determined that the particular part/consumable is not immediately available, and has been placed on backorder, the part/consumable supplier 500 can communicate with the value added service provider 400 indicating that the installation service need be put on hold until the part arrives. Then, upon a determination that the part is available, the part/consumable supplier 500 can further communicate with the value added service provider 400 indicating that the value added service provider 400 can schedule the service date for the electronic system.

Additionally, an action request can be routed to an Original Equipment Manufacturer (OEM) service provider 600. For example, if the nature of the service request requires a highly specialized technician or, perhaps, if the action request can be satisfied by a warranty repair, the OEM service provider may be the appropriate entity for routing of the action request. As with the other service providers, the action request is received via network 25 and link 50, via I/O interface 630, and with the cooperation of the controller 620 and the memory 610, at the service coordination 640. The service coordination 640 then appropriately schedules a service date for the electronic system based on the received action request.

It should be appreciated that while the routing of action requests has been described in relationship to particular service and parts/consumable suppliers, that any combination of one or more of the service providers and/or parts/consumable suppliers can be used as appropriate for the particular embodiment in which the diagnostic system is installed. Therefore, in general, the diagnostic system is capable of communicating with one or more service and/or parts consumable suppliers to schedule an appropriate repair, service and/or part/consumable shipment as needed.

Figure 2:
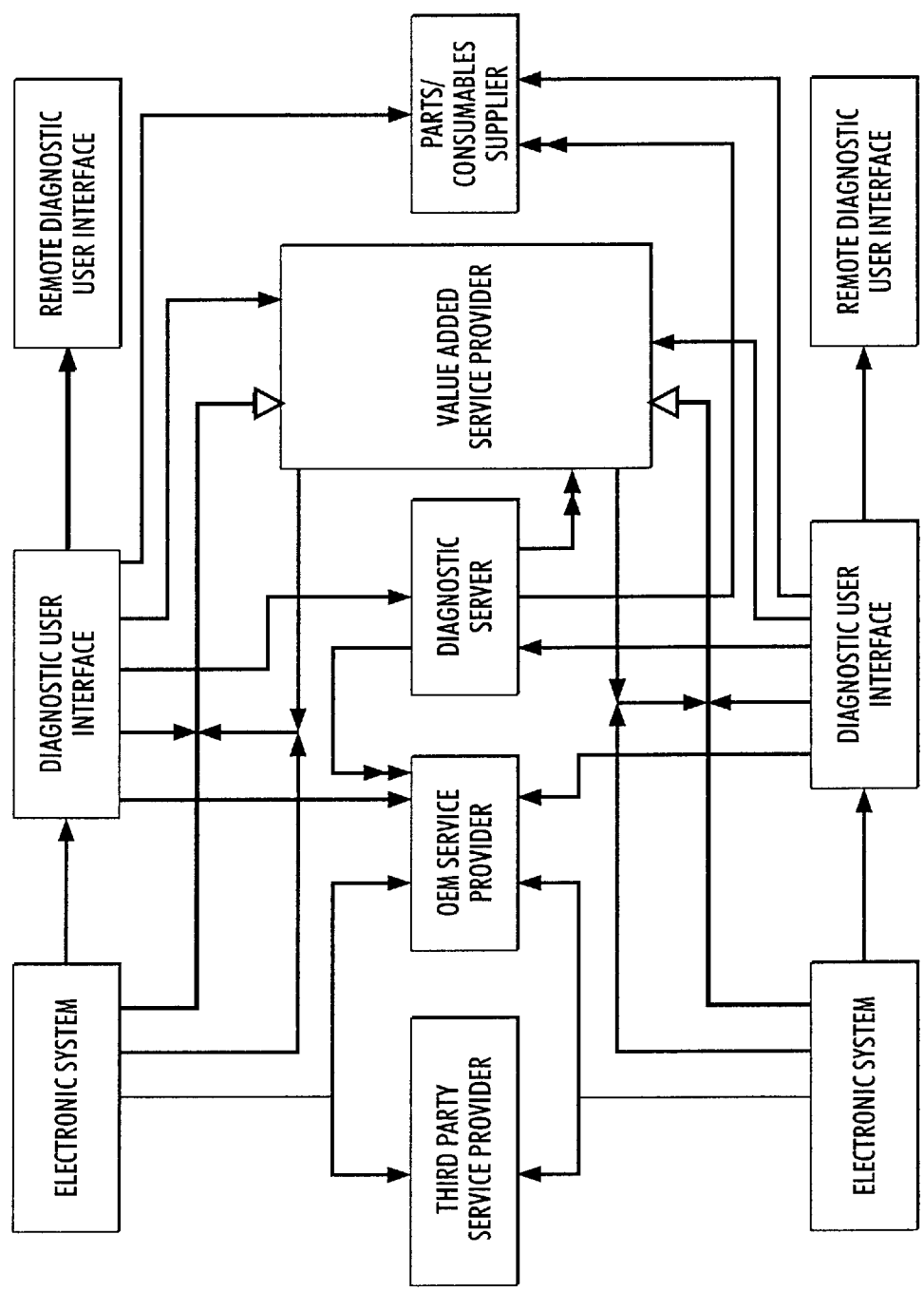
FIG. 2 illustrates an exemplary data flow diagram of the systems and methods of this invention.

FIG. 2 illustrates an exemplary data flow that can occur between the one or more electronic systems and the various systems and/or parts suppliers shown in FIG. 1. For example, the diagnostic data includes "raw" data such as, but not limited to, I/O signal data, e.g., data from intelligent input/out connection chains, serial command bus data, operational conditions, such as temperature, humidity, or the like, basic diagnostic data such as fault counters, calibration data, a high frequency service item data, service history, machine history, or the like that are typically resident in memory, or the like. The single machine value-added diagnostic value includes, but is not limited to, component signatures arising as a result of performance threshold analysis, signature analysis, statistical analysis, trend analysis, rate analysis, timing analysis, event sequence analysis, pattern analysis on the raw data, qualitative and/or quantitative state estimates reflecting machine component status, lists of failed and/or potentially failing components, or the like. The diagnostic data and machine usage data can also include all of the basic diagnostic data as well as machine, or electronic system usage data. The population diagnostic data can include, but is not limited to, aggregated single machine raw data, aggregated single machine processed data, failure data, statistics of part performance across the electronic system fleet that can be used for failure prediction, successful and unsuccessful remediation histories, or the like. Finally, the interrogation commands and control signals are representative of interrogation commands and control signals passed between one or more service engineers and the particular electronic system either directly or via a processor located on the electronic system, or commands autonomously generated by an autonomous repair agent. The control commands, for example, could include calibration procedures, device set-up procedures, control re-configuration commands, hardware re-configuration commands, and the like.

Accordingly, it should be appreciated that while the diagnostic system of this invention has been described in relation to an embodiment in which the monitored electronic system and diagnostic server and the various service and/or parts/consumable suppliers are each remotely located on a distributed network, the systems of this invention could work equally well if all or portions thereof are incorporated into one or more of the other systems within this invention. For example, the database 170 can be located anywhere on the distributed network and, for example, the parts/consumable supplier and OEM service provider could be all located on a particular node of a distributed network. Additionally, one or more components of the diagnostic server could be incorporated into the one or more electronic systems.

Figure 3A:
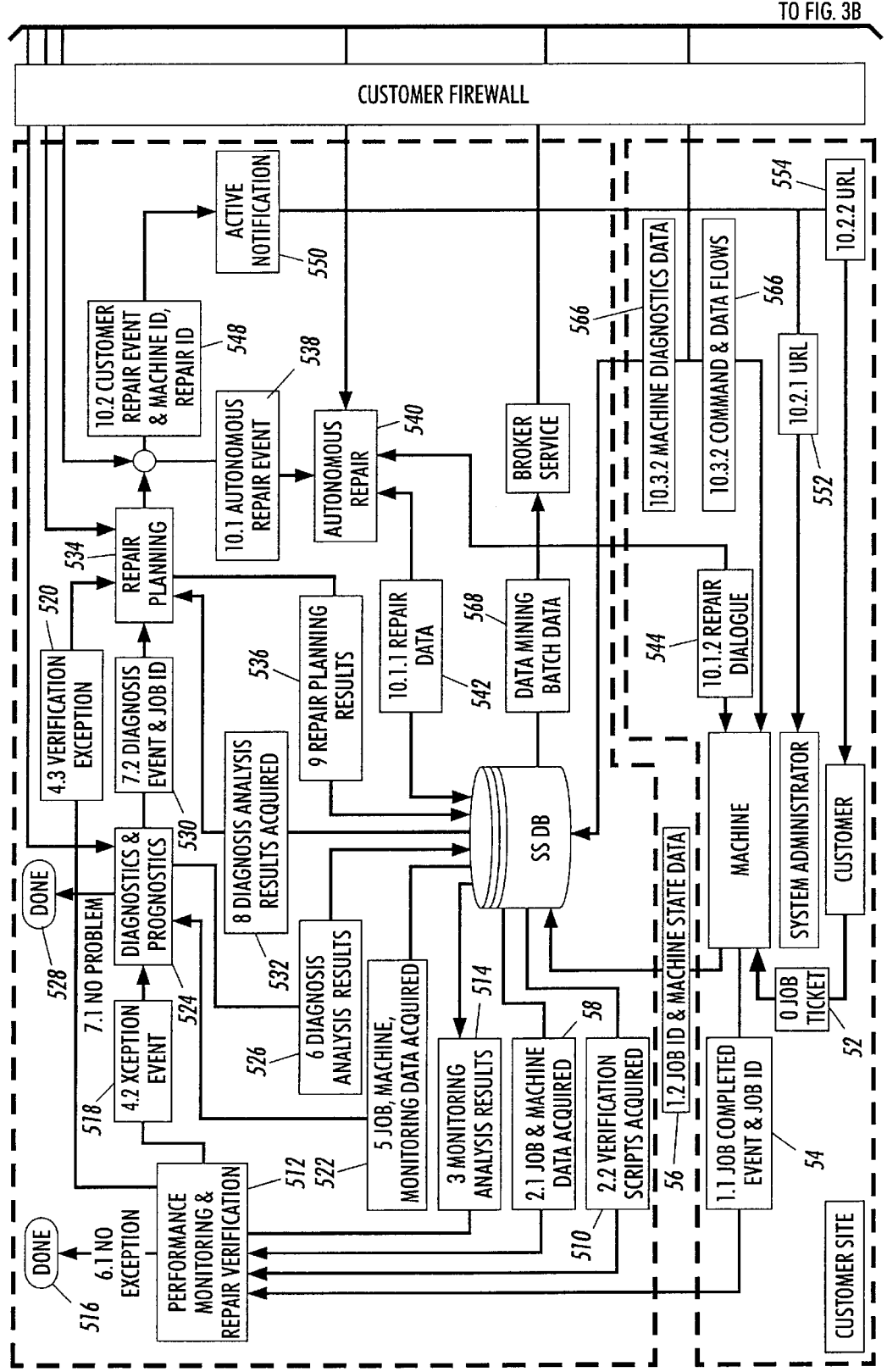
FIGS. 3A-B, illustrate a work flow diagram showing an exemplary operational environment in accordance with the systems of this invention.
Figure 3B:
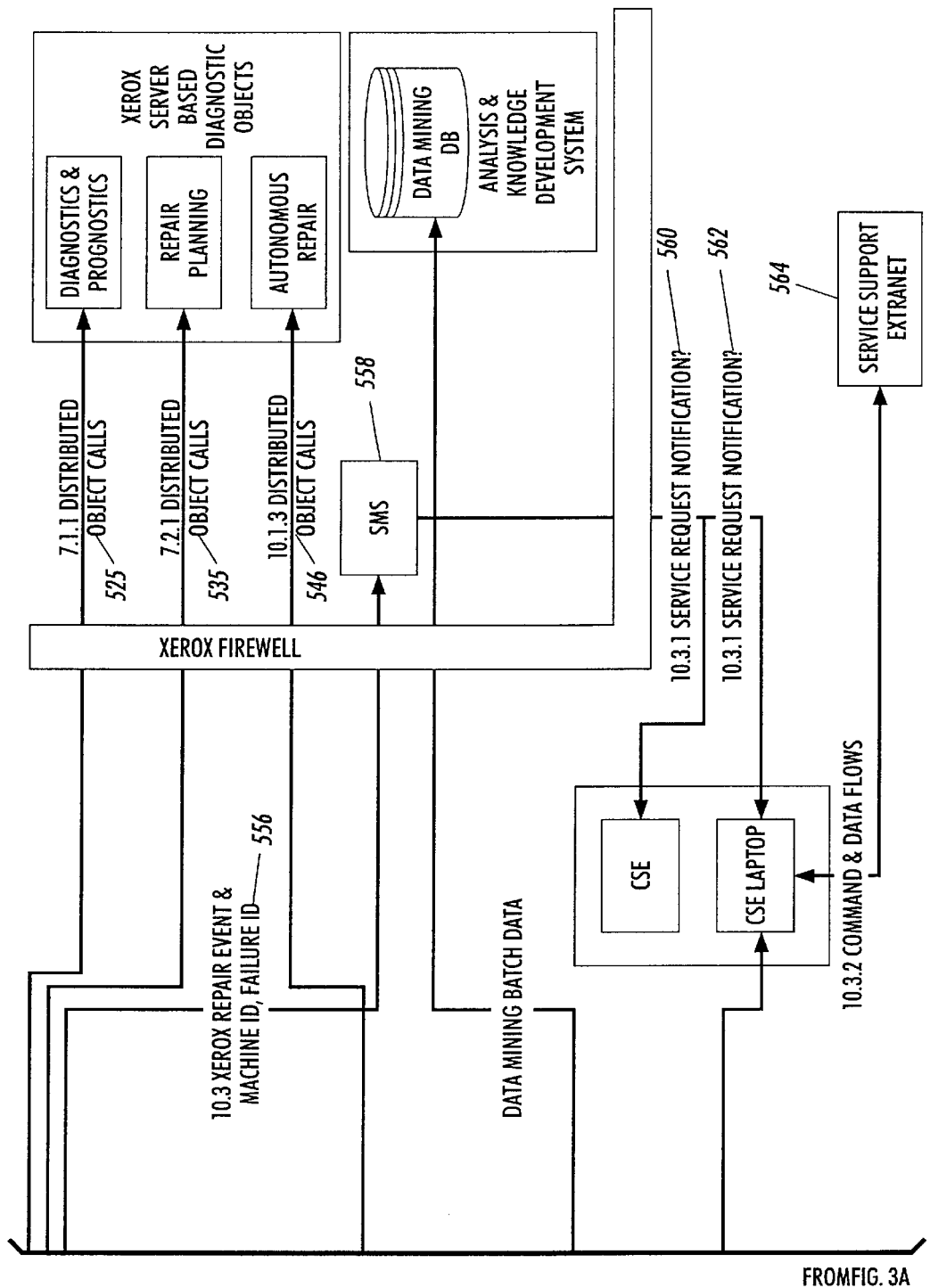

FIG. 3 illustrates a work flow diagram showing an exemplary operational environment and data flows in accordance with the systems and methods of this invention. Specifically, in step S2, a customer issues a job request to a machine. Next, in step S4, the machine completes the job and forwards a job identifier to the diagnostic server. Then, in step S6, the job identifier and the machine state data are forwarded to the diagnostic server database. Then, in step S8, the job identifier and machine data are requested for a performance monitoring/prognostic analysis.

In step S10, the verification scripts are also acquired from the diagnostic server database for the performance monitoring and repair verification analysis. Next, in step S12, the machine data is analyzed for prognostic purposes. This analysis involves simple processing such as checking for flags, threshold analysis, or the like. Then, in step S14, the monitored analysis results are forwarded to the diagnostic server database and stored. Then, in step S16, if no exception event is detected, e.g. no fault is suspected, the process ends.

In step S18, if there is an exception event, an exception event flag is triggered. In step S20, a flag is set that monitors the electronic system for the completion of the repair event. In particular, as discussed hereinafter, a script is run that monitors the ongoing flow of data from the electronic device. The script is run until either the repair is completed and verified by the script, or until a time interval has passed. If the script time interval passes, a second repair event is sent.

In step S22, the job, machine and monitoring data are acquired for the diagnostics and prognostics analysis. Next, in step S24, the diagnostics and prognostics analysis are run on the job, machine and monitoring data. This involves a more detailed analysis as compared to step S12 and may involve, for example, invocation of a reasoning algorithm or an expert system. Additionally, in step S25, a distributed call can be made to additional servers with diagnostics and prognostics capabilities. Then, in step S25, the diagnosis analysis results are stored in the diagnostic server database.

In step S28, if no problems are determined to exist, the control sequence ends. Otherwise, in step S30, the determined diagnosis event and job identifier are acquired for repair planning. Next, in step S32, the diagnosis analysis results are acquired from the diagnostic server database. Then, in step S34, the repair planning is commenced. This includes, in step S35, forwarding distributed object calls to the repair planning portions of one or more server based diagnostic objects, resident in one or more serves. Additionally, the results of the repair planning, in step S36, are forwarded and stored in the diagnostic server database.

If in the repair planning step it is determined that an autonomous repair event is available, control continues to step S38. Then, in step S40, the autonomous repair sequence is commenced for the faulty machine. Specifically, in step S42, the repair data is made available for the autonomous repair sequence. Next, in step S44, a repair dialogue is commenced with the faulty machine. Then, in step S46, distributed object calls are made to the autonomous repair portions of the one or more servers.

In step S48, the repair planning step determined that a customer/system administrator repair event is recommended. Specifically, in step S48, the identification or instructions for the customer repair, the machine identification and the repair identification are forwarded to the customer site. In step S50, the active notification step forwards instructions/information to the customer based on a predefined criteria. In particular, a customer can agree to perform certain repairs/maintenance on-site. If the repair event falls into one of these predefined categories, the active notification step S50 determines the necessary information to forward to the customer to effect the repair/maintenance. Next, in step S52, the repair action is forwarded to the system administrator at the customer site, via, for example, a web page. Alternatively, or additionally, in step S54, the repair action is forwarded to the customer at the customer site, via, for example, a web page.

Alternatively, in step S56, the repair planning step determines that external service support is required. The repair event, machine identifier and repair identifier are forwarded to a Service Management System (SMS). This system supports the scheduling and disposition of service support engineers. In step S58, the SMS determines the appropriate service support engineer(s) to provide the service, given the machine and repair identifiers. The SMS then generates service request notifications to assign the engineers to the service activities.

In steps S60 and S62, a service request notification is provided to an appropriate customer service engineer. This notification can be provided by a variety of telecommunications and computing devices including a phone, a pager, a laptop or the Internet.

In step S64, the customer service engineer accesses additional service information and process capabilities from the service support extranet. This extranet provides additional applications and capabilities such as electronic documentation, call handling, parts ordering, bulletin boards, and so on.

In step S66, either remotely, or through an onsite visit, the customer service engineer accesses the electronic device to effect a repair. Additional information required to support the repair may be accessed from the diagnostics server including device diagnostic data, and device usage and service history.

After the repair planning step has determined a repair action and a vehicle by which the repair is to be effected, it also creates a verification script. The script embodies a computational method for determining the absence of the failure determined by the diagnostic software in steps S14 and S24. This script is forwarded to the performance monitoring and repair verification software. The script is run by this software and it monitors the ongoing flow of data from the electronic device. The script is run until either the repair is completed and verified by the script or until a time interval has passed. If the script time interval passes, a second repair event is sent, this time to the SMS only.

Additionally, in step S68, at any time in the diagnosis process, any and all information from the diagnostic server can be forwarded to a centralized database and used as a basis for detailed analysis and futher development of prediction, diagnosis, and remediation.

Figure 4:
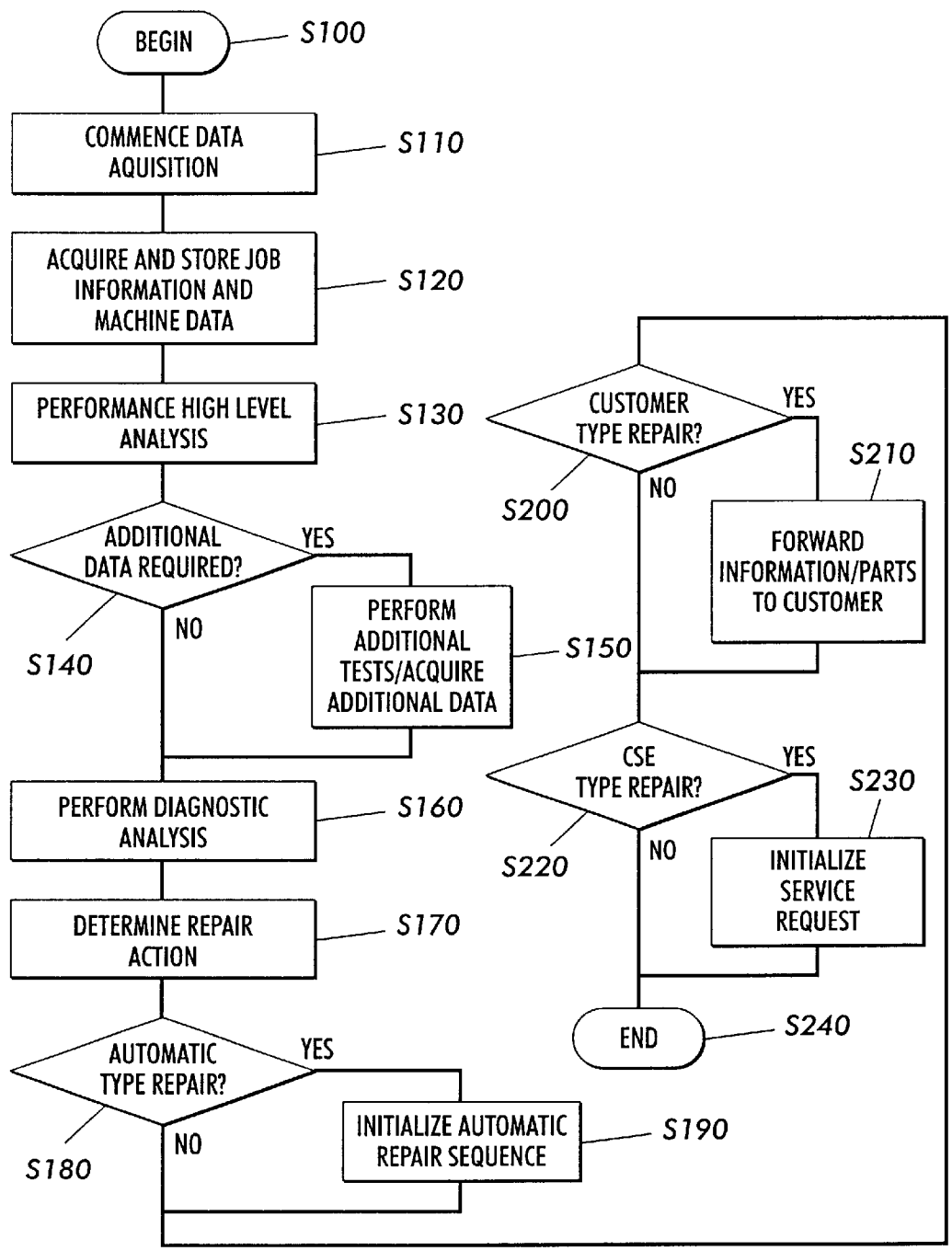
FIG. 4 is a flowchart outlining one exemplary embodiment of the method for diagnosing electronic systems according to this invention.

FIG. 4 illustrates an exemplary flowchart of one method for diagnosing one or more electronic systems in accordance with this invention, where the electronic system has indicated a failure has occurred. Control begins in step S100 and continues to step S110. In step S110, data is acquired from the electronic system. Next, in step S120, the job information and machine data are acquired and stored. Then, in step S130, a high level analysis of the acquired data is performed. Control the continues to step S140.

In step S140, a determination is made whether additional data is required. If additional data is required, control continues to step S150 where additional data is acquired and/or additional tests are performed to acquire additional data. Control then continues to step S160.

In step S160 a diagnostic analysis is performed. Next, in step S170, the appropriate repair action is determined. Then, in step S170, a determination is made whether the determined type of repair action is an automatic type repair. If the determined type of repair action is automatic, control continues to step S190 where the automatic repair sequence is commenced. Otherwise, control jumps to step S200.

In step S200, a determination is made whether the determined type of repair action is a customer type repair. If the determined type of repair action is a customer type repair, control continues to step S210 where the appropriate information and/or parts are forwarded to the customer and/or the system administrator. Otherwise, control jumps to step S220.

In step S220, a determination is made whether the determined type of repair action is a customer service engineer type repair. If the determined type of repair action is a customer service engineer type repair, control continues to step S230 where the service request is initialized. Otherwise, control jumps to step S240 where the control sequence ends.

Figure 5:
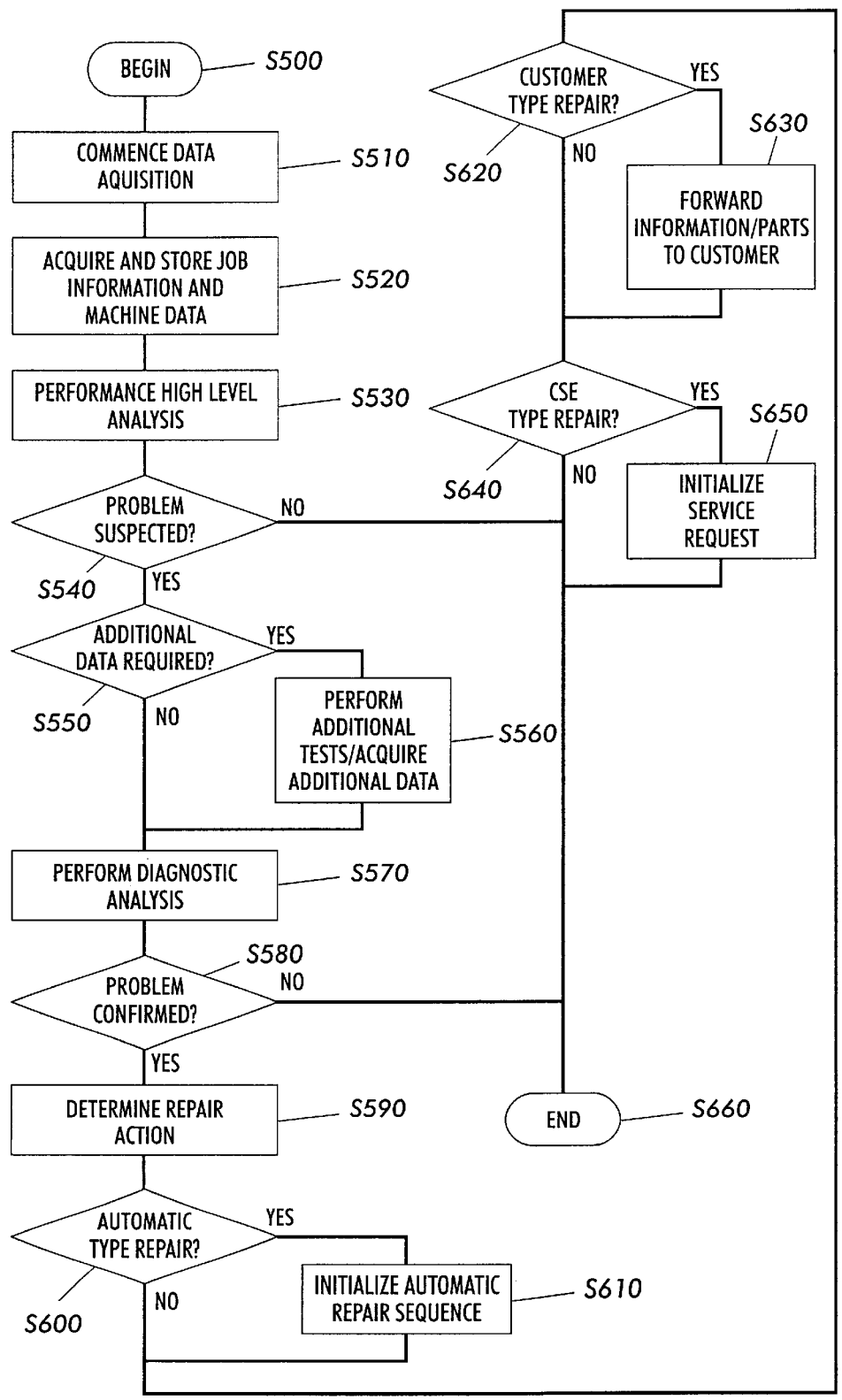
FIG. 5 is a flowchart outlining a second exemplary embodiment of the method for diagnosing electronic systems according to this invention.

FIG. 5 illustrates an exemplary flowchart of a second method for diagnosing one or more electronic systems in accordance with this invention, where the electronic system has not indicated that a failure has occurred. Control begins in step S500 and continues to step S510. In step S510, data is acquired from the electronic system. Then, in step S520, the job information and machine data are acquired and stored. Next, in step S530, a high level analysis of the acquired data is performed. Control then continues to step S540.

In step S540, a determination is made whether the high level analysis suspects a problem, i.e., whether a failure is suspected. If a failure is not found to be impending, control jumps to step S660 where the control sequence ends. Otherwise, control continues to step S550.

In step S550, a determination is made whether additional data is required. If additional data is required, control continues to step S560 where additional data is acquired and/or additional tests are performed to acquire additional data. Control then continues to step S570.

In step S570 a prognostic analysis is performed. Next, in step S580 a determination is made whether a problem is confirmed. If a problem is confirmed, i.e., if a failure is found to be impending, control continues to step S590. Otherwise control jumps to step S660 where the control sequence ends.

In step S590, the appropriate repair action is determined. Then, in step S600, a determination is made whether the determined type of repair action is an automatic type repair. If the determined type of repair action is automatic, control continues to step S610 where the automatic repair sequence is commenced. Otherwise, control jumps to step S620.

In step S620, a determination is made whether the determined type of repair action is a customer type repair. If the determined type of repair action is a customer type repair, control continues to step S630 where the appropriate information and/or parts are forwarded to the customer and/or system administrator. Otherwise, control jumps to step S640.

In step S640, a determination is made whether the determined type of repair action is a customer service engineer type repair. If the determined type of repair action is a customer service engineer type repair, control continues to step S650 where the service request is initialized. Otherwise, control jumps to step S660 where the control sequence ends.

As shown in FIG. 1, the diagnosis and failure prediction system is preferably implemented either on a single program general purpose computer or separate programmed general purpose computer. However, the diagnosis and failure prediction system can also be implemented on a special purpose computer, a programmed microprocessor or microcontroller and peripheral integrated circuit element(s), an ASIC, or other integrated circuit, a digital signal processor, a hardwired electronic or logic circuit such as a discrete element circuit, a programmable logic device such as a PLD, PLA, FPGA, PAL, or the like. In general, any device, capable of implementing a finite state machine that is in turn capable of implementing the flowcharts shown in FIGS. 3-5 can be used to implement the diagnosis and failure prediction system.

Furthermore, the disclosed method may be readily implemented in software using object or object-oriented software development environments that provide portable source code that can be used on a variety of computer or workstation hardware platforms. Alternatively, the disclosed search system may be implemented partially or fully in hardware using standard logic circuits or a VLSI design. Whether software or hardware is used to implement the systems and methods in accordance with this invention is dependent on the speed and/or efficiency requirements of the system, the particular function, and the particular software or hardware systems or microprocessor or microcomputer systems being utilized. The diagnosis and failure prediction systems and methods described above, however, can be readily implemented in hardware or software using any known or later-developed systems or structures, devices and/or software by those skilled in the applicable art without undue experimentation from the functional description provided herein together with a general knowledge of the computer arts.

Moreover, the disclosed methods may be readily implemented as software executed on a programmed general purpose computer, a special purpose computer, a microprocessor, or the like. In this case, the methods and systems of this invention can be implemented as a routine embedded on a personal computer such as a Java® or CGI script, as a resource residing on a server or graphics workstation, as a routine embedded in a dedicated diagnosis and failure prediction control system, or the like. The diagnosis and failure prediction system can also be implemented by physically incorporating the system and method into a software and/or hardware system, such as the hardware and software systems of a workstation or dedicated diagnosis and failure prediction control system.

It is, therefore, apparent that there has been provided, in accordance with the present invention, systems and methods for diagnosis and failure prediction of electronic systems within distributed networks. While this invention has been described in conjunction with preferred embodiments thereof, it is evident that many alternatives, modifications, and variations will be apparent to those skilled in the art. Accordingly, Applicants intend to embrace all such alternatives, modifications and variations that follow in the spirit and scope of this invention.

What is claimed is:

1. A system for failure prediction, diagnosis and remediation of at least one electronic system in a distributed network comprising:
   a data acquisition circuit that acquires data about the at least one electronic system;
   a prediction circuit that performs at least one of a prognostic and a diagnostic analysis of the acquired data;
   a repair planning circuit that determines an appropriate repair action in response to at least one of a prognostic and a diagnostic analysis, wherein the appropriate repair action is at least an autonomous repair; and
   a database that stores at least a portion of the acquired data.

2. The system of claim 1, wherein the acquired data is at least one of component level data, system level data, event level data, job level data, control data, diagnostic data, environmental data, machine usage data, machine configuration data, single-machine value-added diagnostic data and population diagnostic data.

3. The system of claim 1, wherein the acquired data is acquired in one or more operational modes of the electronic system, including at least one of a normal mode, a diagnostic mode, a failed mode and a limp-along mode.

4. The system of claim 1, wherein the at least one of the prognostic and the diagnostic analysis is based on at least one of a threshold analysis, a statistical analysis, a signature analysis, a trend analysis, a timing analysis, an event sequence analysis, a pattern analysis, an image processing technique, a quantitative and a qualitative state estimation technique, a model based diagnostic technology, a look-up table, a bayesian network, a causal network, a neural network based analysis, a fuzzy logic based analysis, a rule based system analysis and an expert system.

5. The system of claim 1, further comprising a routing circuit that routes a part request to at least one part supplier.

6. A system for failure prediction, diagnosis and remediation of at least one electronic system in a distributed network comprising:
   a data acquisition circuit that acquires data about the at least one electronic system;
   a prediction circuit that performs at least one of a prognostic and a diagnostic analysis of the acquired data;
   a repair planning circuit that determines an appropriate repair action in response to at least one of a prognostic and a diagnostic analysis, wherein the appropriate repair action is at least one of an autonomous repair, a customer type repair and a customer service engineer type repair;
   an autonomous repair circuit that controls the autonomous repair; and
   a database that stores at least a portion of the acquired data.

7. The system of claim 6, wherein the autonomous repair circuit establishes a communication with the at least one electronic system, the communication including at least one of transferring monitoring information, interrogation information, control information, repair information and results of the failure prediction, diagnosis and remediation analysis.

8. The system of claim 6, wherein the repair planning circuit forwards at least one of a repair information to a customer, a parts request to an appropriate entity, a service request notification to a customer service engineer and an autonomous repair entity.

9. A method for failure prediction, diagnosis and remediation of an electronic system in a distributed network comprising:
   acquiring data about one or more electronic systems;
   performing at least one of a prognostic and a diagnostic analysis of the acquired data;
   determining an appropriate repair action in response to the at least one of the prognostic and the diagnostic analysis, wherein the appropriate repair action is at least an autonomous repair;
   determining if additional data is required; and
   requesting additional data from the electronic system.

10. The method of claim 9, further comprising forwarding repair information to a customer.

11. The method of claim 9, further comprising forwarding a parts request to an appropriate entity.

12. The method of claim 9, wherein the acquired data is at least one of component level data, system level data, event level data, job level data, control data, diagnostic data, environmental data, machine usage data, machine configuration data, single-machine value-added diagnostic data and population diagnostic data.

13. The method of claim 9, wherein the acquired data is collected in one or more modes of operation of the machine, including at least one of a normal mode, a diagnostic mode, a failed mode and a limp-along mode.

14. The method of claim 9, further comprising spawning a distributed object call to a remote server.

15. The method of claim 9, wherein the at least one of the prognostic and the diagnostic analysis, the repair determination action and the repair action are performed at one or more of the electronic system or at a remote location.

16. The method of claim 9, wherein the at least one of the prognostic and the diagnostic analysis is based on at least one of a threshold analysis, a statistical analysis, a signature analysis, a trend analysis, a timing analysis, an event sequence analysis, a pattern analysis, an image processing technique, a quantitative and a qualitative state estimation technique, a model based diagnostic technology, a look-up table, a neural network based analysis, a fuzzy logic based analysis, a rule based system analysis and an expert system.

17. The method of claim 9, further comprising routing a part request to at least one part supplier.

18. A method for failure prediction, diagnosis and remediation of an electronic system in a distributed network comprising:
   acquiring data about one or more electronic systems;
   performing at least one of a prognostic and a diagnostic analysis of the acquired data;
   determining an appropriate repair action in response to the at least one of the prognostic and the diagnostic analysis, wherein the appropriate repair action is at least one of an autonomous repair, a customer type repair and a customer service engineer type repair;
   initializing the autonomous repair when such repair action is to be performed;
   determining if additional data is required; and
   requesting additional data from the electronic system.

19. The method of claim 18, wherein initializing the autonomous repair includes establishing a communication with the electronic system.

20. The method of claim 19, wherein the communication includes at least one of transferring monitoring information, interrogation information, control information and results information.

21. The method of claim 18, further comprising:
   initiating a customer service engineer service request; and
   forwarding a service request notification to a customer service engineer.

22. An information storage medium that stores information for failure prediction, diagnosis and remediation of an electronic system in a distributed network comprising:
   information that acquires data about one or more electronic systems;
   information that performs at least one of a prognostic and a diagnostic analysis of the acquired data;
   information that determines an appropriate repair action in response to the at least one of the prognostic and the diagnostic analysis, wherein the appropriate repair action is at least an autonomous repair;
   information that determines if additional data is required; and
   information that requests additional data from the electronic system.

23. The information storage medium of claim 22, further comprising information that forwards repair information to a customer.

24. The information storage medium of claim 22, further comprising information that forwards a parts request to an appropriate entity.

25. The information storage medium of claim 22, wherein the acquired data is at least one of component level data, system level data, event level data, job level data, control data, diagnostic data, environmental data, machine usage data, machine configuration data, single-machine value-added diagnostic data and population diagnostic data.

26. The information storage medium of claim 22, wherein the acquired data is collected in one or more modes of operation of the machine, including at least one of a normal mode, a diagnostic mode, a failed mode and a limp-along mode.

27. The information storage medium of claim 22, further comprising information that spawns a distributed object call to a remote server.

28. The information storage medium of claim 22, wherein the at least one of the prognostic and the diagnostic analysis, the repair determination action and the repair action are performed at one or more of the electronic system or at a remote location.

29. The information storage medium of claim 22, wherein the at least one of the prognostic and the diagnostic analysis is based on at least one of a threshold analysis, a statistical analysis, a signature analysis, a trend analysis, a timing analysis, an event sequence analysis, a pattern analysis, an image processing technique, a quantitative and a qualitative state estimation technique, a model based diagnostic technology, a look-up table, a neural network based analysis, a fuzzy logic based analysis, a bayesian network, a causal network, a rule based system analysis and an expert system.

30. The information storage medium of claim 22, further comprising information that routes a part request to at least one part supplier.

31. An information storage medium that stores information for failure prediction, diagnosis and remediation of an electronic system in a distributed network comprising:
   information that acquires data about one or more electronic systems;
   information that performs at least one of a prognostic and a diagnostic analysis of the acquired data;
   information that determines an appropriate repair action in response to the at least one of the prognostic and the diagnostic analysis, wherein the appropriate repair action is at least one of an autonomous repair, a customer type repair and a customer service engineer type repair;
   information that initializes the autonomous repair when such repair action is to be performed;
   information that determines if additional data is required; and
   information that requests additional data from the electronic system.

32. The information storage medium of claim 31, wherein initializing the autonomous repair includes establishing a communication with the electronic system.

33. The information storage medium of claim 32, wherein the communication includes at least one of transferring monitoring information, interrogation information, control information, repair information and results of the failure prediction, diagnosis and remediation analysis.

34. The information storage medium of claim 31, further comprising:
   information that initiates a customer service engineer service request; and
   information that forwards a service request notification to a customer service engineer.

* * * * *